No. 853,442. PATENTED MAY 14, 1907.
W. R. CUNNINGHAM.
INTERCHANGEABLE MOLD BOX.
APPLICATION FILED DEC. 29, 1906.
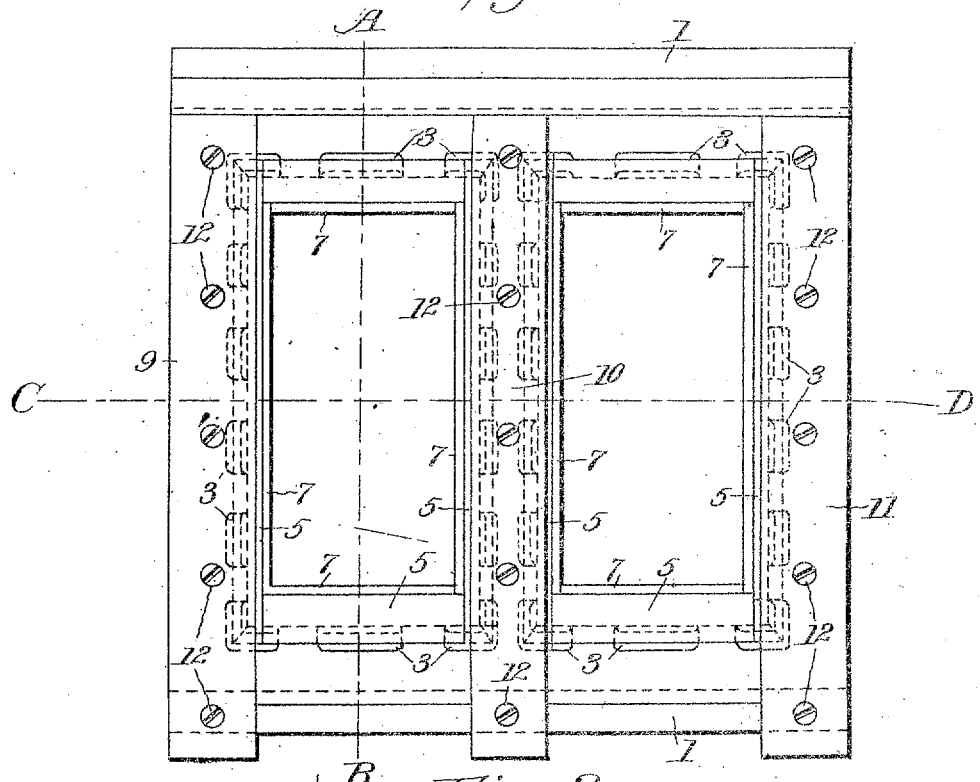
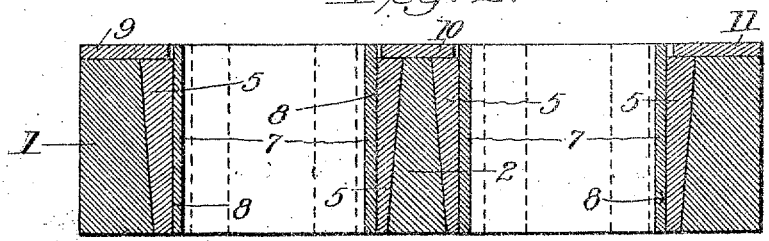
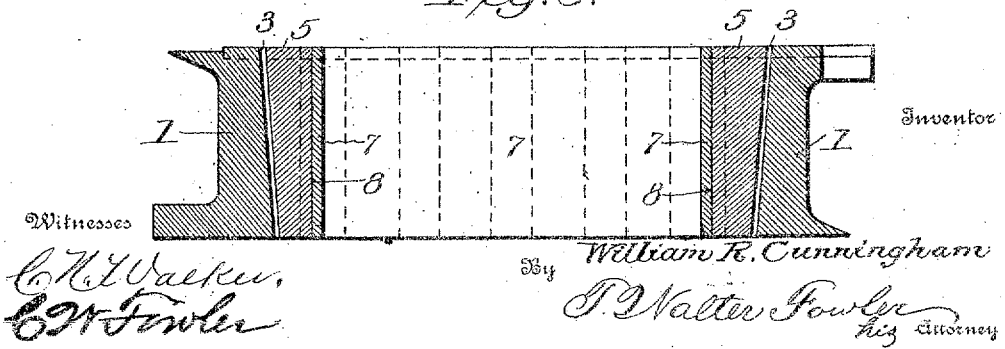

UNITED STATES PATENT OFFICE

WILLIAM R. CUNNINGHAM, OF BUCYRUS, OHIO, ASSIGNOR TO THE AMERICAN CLAY MACHINERY CO., OF BUCYRUS, OHIO, A CORPORATION.

INTERCHANGEABLE MOLD-BOX

No. 853,442.  Specification of Letters Patent.  Patented May 14, 1907.

Application filed December 29, 1906. Serial No. 349,968.

*To all whom it may concern:*

Be it known that I, WILLIAM R. CUNNINGHAM, a citizen of the United States, residing at Bucyrus, in the county of Crawford and State of Ohio, have invented new and useful Improvements in Interchangeable Mold-Boxes, of which the following is a specification.

My invention relates to certain new and useful improvements in interchangeable mold boxes designed especially for use in repress machines, although in its use it is not restricted to this particular type of machines as it is applicable to any kind of press employing a mold box and designed or adapted to make a number of sizes and shapes of plastic products.

My invention consists of the parts and the constructions and combinations of parts forming an interchangeable mold box of the character which I will hereinafter describe and claim.

In the accompanying drawings forming part of this specification and in which similar reference characters indicate like parts,—

Figure 1, is a top plan view of an interchangeable mold-box embodying my invention. Fig. 2, is a vertical sectional view on the line C—D of Fig. 1. Fig. 3, is a similar view on the line A—B of Fig. 1.

In the manufacture of molded clay products it is necessary to make a number of sizes and shapes of the different articles, which necessitates frequent changing of the molds or dies that form the ware. Heretofore much delay and expense were created in dismantling the machine in order to change from one shape or size of mold to another, and to lessen this expense and economize in the time required to make the change, are the essential objects of my invention.

While my invention is applicable to either single or duplex molds I have preferred to illustrate the invention in connection with a mold of a duplex character; and to make the salient features of the invention more pronounced, I illustrate said invention without association with the machine or press with which it is usually used; likewise I omit the usual and well known pressure plates which enter the top and bottom of the mold and squeeze the interposed plastic material therebetween and thereby form the ware the desired shape and size.

Referring to the aforesaid drawings, 1 represents a frame of suitable form and usually cast in one piece, having suitable means, as flanges, by which it may be retained in place in the machine. The outer walls of this frame are made to suit the machine in which the mold is to be used. As herein shown the outer ends are parallel, likewise the ends and the top and bottom surfaces. Cast integral with the frame is a central partition, 2, which divides the frame into the two compartments shown, thereby forming a double or duplex mold-box.

It will be observed in Figs. 2 and 3, that the inner walls of the open frame 1 and the walls of the partition, converge downwardly and in practice these inner surfaces are machined at an angle to make the mold chamber or opening at the lower side of less diameter than at the upper side, the said chamber being made a standard size to receive the inner removable frame of the mold proper. It will also be observed that in Fig. 1, I show the inside of the frame 1 and the partition 2 as recessed at 3 in order to lower the cost of manufacturing the die or mold to the consumer or user.

The inner frames 5, or molds proper, are shown of rectangular form and having their outer sides machined or tapered downwardly and parallel with the tapering inner walls of the frame 1 and partition 2. The inner walls of the sides of the frames 5 are parallel and the inner walls of the ends are parallel and at right-angles with said sides whereby the chamber inclosed by the sides and ends of each inner frame is uniform and in the mold shown, substantially rectangular. The inner frames 5, I construct of metal although other suitable material may be used, if desired.

In order to prolong the life or wearing qualities of the inner frames, each of said frames is machined sufficiently large in the first instance to admit the hardened metal liners 7 which I machine to form perfect bearings on the inner surfaces of the frames 5, as shown at 8 in Figs. 2 and 3. These liners are held in position by means of rivets which pass through the liners and also through the inner frames 5.

That I may hold the inner frames and liners in place, I employ metal plates 9, 10 and 11 secured to the top surfaces of the frames 1 and partition 2, which surfaces are machined down or recessed to make the upper surfaces of the plates flush with the upper surfaces of the frames 1 and 5, the said plates being secured by screws 12 or other well known, easily removable, means. Whenever it becomes necessary to remove a frame 5 with its liners, the proper plates 7 are removed from the top of the frame 1 and partition 2, when a smaller mold or die may be inserted and secured by the replacement of said plates 9, 10 and 11. If the smaller die or mold, or a mold or die of different shape from the one removed, is required, the outer surface will be machined to correspond with the inclined or tapering inner walls of the outer frame 1 and partition 2, and when said die or mold is placed in position, it is held by the plates and screws before mentioned.

As before stated, the primary object of my invention is to provide an inner mold or frame which is capable of removal to admit another readily and without removing the outer frame 1 from the machine or pressing mechanism, said inner mold or frame having, preferably, a removable lining on its inner walls.

Having thus described my invention, what I claim as new and desire to secure by Letters Patent is,—

1. A mold box comprising inner and outer frames, said inner frame being interchangeable and removably fitting the outer frame, said frames having their adjacent sides tapering downwardly, and parallel and substantially fitting each other, said inner frame having its interior fashioned to conform to the article to be molded, and retaining plates fixed to one of said frames and having a long side extending horizontally over in contact with the top or thicker end of the other frame to removably hold the inner frame in place.

2. A mold box comprising an outer frame having sides and ends, the outer walls of said sides being parallel and the outer walls of the ends being parallel, said frame having inner side and end walls converging downwardly, and a removable frame within said outer frame, having the walls of its sides and ends converging conformably to the inner walls of the outer frame and having its inner walls fashioned to conform to the article to be molded, liners fixedly secured to the inner walls of said inner frame and removable retaining plates secured to the top of the outer frame and having their long sides extending over in contact with the top surface of the inner frame and removably securing said inner frame in position.

3. A mold box having an outer frame, and an interchangeable inner frame removably fitting within the same, said frames having their adjacent sides tapering downwardly, and the upper ends of the frames being recessed, and retaining plates fitting said recesses and extending across and to each side of the joint between the frames whereby the inner frame is held in position, said plates being secured to one of said frames and having its top surface substantially flush with the upper surfaces of the frame.

4. A duplex mold box comprising an outer frame having side and ends and a partition dividing said box into two compartments, the side walls of the partition and the inner walls of said sides and ends being tapered, an inner frame for each of said compartments, said inner frames having outer walls tapered conformably to the inner walls of the outer frame, the upper surfaces of the outer frame and of the partition being machined or recessed, retaining plates fitting said recesses and extending over in contact with the upper surfaces of the inner frames, and removable fastening means for said plates.

In testimony whereof I have hereunto set my hand in presence of two subscribing witnesses.

WILLIAM R. CUNNINGHAM.

Witnesses:
G. F. ACKERMAN,
R. O. PERROTT.